Dec. 30, 1930.                J. T. HUSTVET                1,786,492
                           DIFFERENTIAL CLUTCH
                           Filed Dec. 19, 1929          3 Sheets-Sheet 1
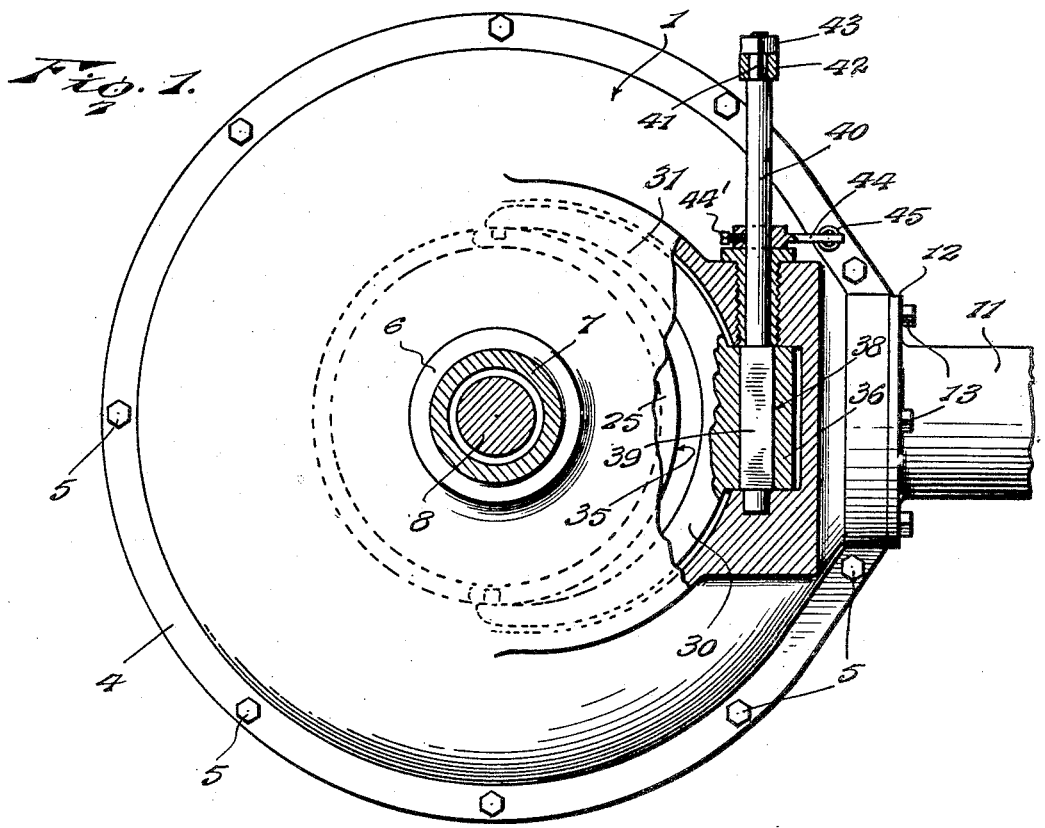
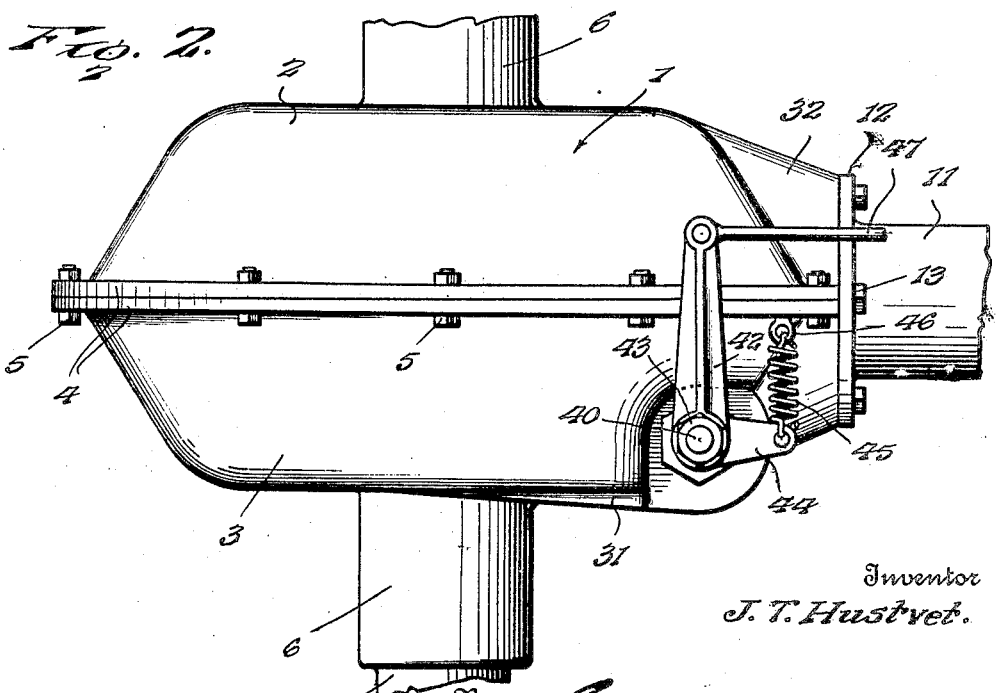
Inventor
J. T. Hustvet.
By Lacey Lacey,
Attorneys

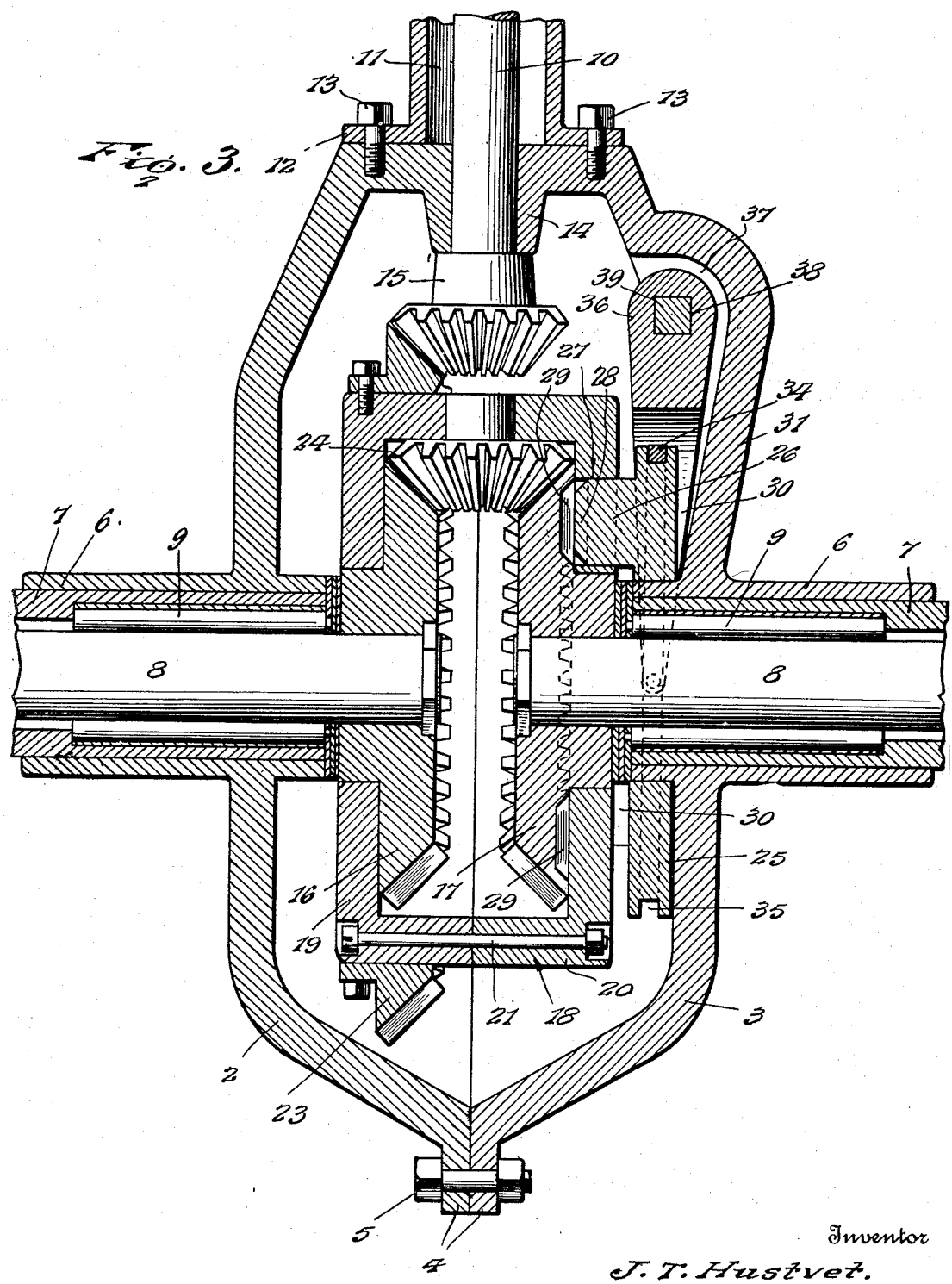

Dec. 30, 1930.  J. T. HUSTVET  1,786,492
DIFFERENTIAL CLUTCH
Filed Dec. 19, 1929   3 Sheets-Sheet 3

Inventor
J. T. Hustvet.
By Lacey & Lacey, Attorneys

Patented Dec. 30, 1930

1,786,492

UNITED STATES PATENT OFFICE

JACOB T. HUSTVET, OF LAMPSON, WISCONSIN

DIFFERENTIAL CLUTCH

Application filed December 19, 1929. Serial No. 415,274.

This invention relates to differentials and more particularly to a differential of the type used in automobile construction.

When an automobile is traveling over roads or streets which have become slippery due to ice or mud, it often occurs that one wheel of the automobile will strike a slippery place and turn without the tire gripping the roadway. When this occurs, the automobile is liable to skid. It has also been found that very often when an automobile is parked with one wheel resting upon a slippery or muddy spot it is very difficult and some times impossible to start the automobile. This is due to the fact that one wheel turns freely whereas the other rests firmly upon the ground and since the differential allows the wheels to turn independently of each other the wheel resting upon the slippery place will rotate and the other wheel remain stationary.

Therefore, one object of the invention is to provide a differential with a clutch by means of which a gear which is normally allowed to turn freely in the gear casing of the differential may be locked to the gear casing and thereby cause the two sections of a rear axle to rotate together. By this arrangement the two wheels of the automobile may be caused to turn at the same rate of speed and skidding prevented and also an automobile allowed to start easy even if one of the wheels is resting upon a slippery place.

Another object of the invention is to provide the differential with a clutch which will normally remain inactive but may be very easily moved into position to lock the free gear of the differential to the casing.

Another object of the invention is to so construct and mount the clutch that it may be easily actuated from the driver's seat and thereby allow the driver of the automobile to move the clutch to an operative position when necessary without leaving the driver's seat.

Another object of the invention is to provide the differential with a clutch which is strong and durable and not liable to get out of order.

The invention is illustrated in the accompanying drawings, wherein

Figure 1 is a view showing a differential housing having the improved clutch applied thereto, the view being partially in elevation and partially in section.

Fig. 2 is a top plan view of the differential,

Fig. 3 is a longitudinal sectional view of the differential,

Figure 4:
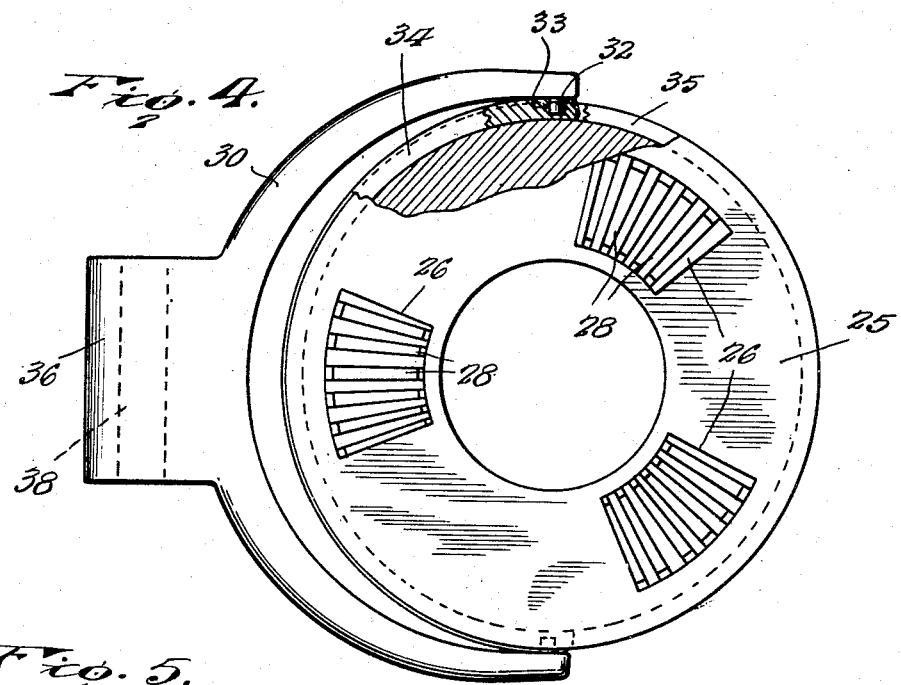
Fig. 4 is a view showing a portion of the clutch in elevation.
Figure 5:
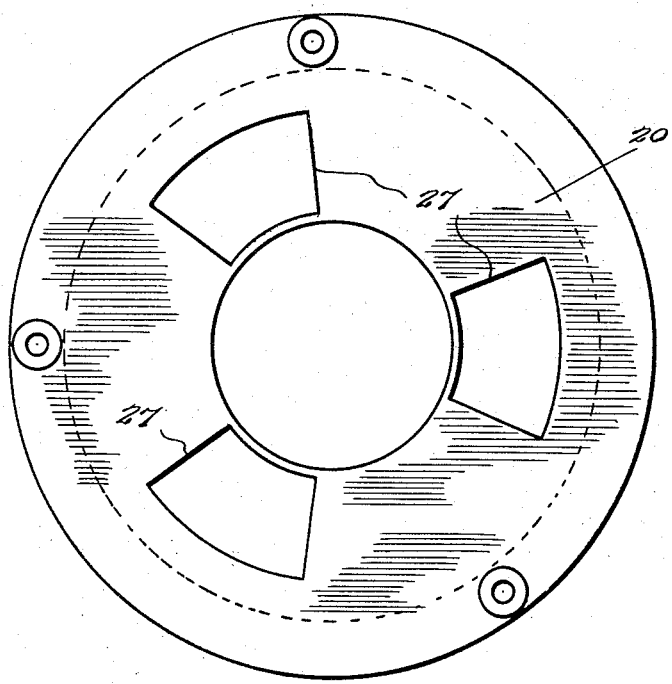
Fig. 5 is a view looking at the outer face of a side portion of the gear casing with which the clutch is associated.

The differential, which is shown in Figures 1, 2 and 3, includes a housing 1 formed of separable sections 2 and 3 having marginal flanges 4 through which bolts or equivalent fasteners 5 are passed to securely but releasably retain the sections united. Opposed sleeves 6 are provided at the centers of the housing sections and into these sleeves are fitted the inner ends of axle casings 7 through which pass axle sections or shafts 8 which project into the housing and are rotatably mounted by roller bearings 9. The drive shaft 10 is surrounded by the usual casing 11 having one end formed with a collar 12 secured to the housing sections 2 and 3 by bolts 13 and this shaft 10 is rotatably mounted in a bearing 14 formed by contacting portions of the housing sections and at its inner end carries the usual pinion 15. Gears 16 and 17 are fixed upon the inner ends of the axle sections or driven shafts 8 to rotate with the same and the gears are enclosed by a casing 18 consisting of companion side sections 19 and 20 which fit about the hubs of the gears and are secured together by a suitable number of bolts 21 spaced from each other circumferentially of the casing. About the casing section 19 is secured a gear ring 23, the teeth of which mesh with the pinion 15 so that when the drive shaft 10 leading from the motor of the automobile is rotated rotary motion will be imparted to the gear casing and the gear 16. A pinion 24 which has its hub rotatably mounted between contacting portions of the casing sections, as shown in Figure 3, is disposed in the casing radially thereof between the gears 16 and 17 and meshes with these gears. Therefore, when the gear casing is rotated, the gear 17 may turn with the gear 16 or the pinion may rotate with the gear 16 and move about the gear 17 and allow the shaft or axle section carrying the gear 16 to rotate independently of the shaft or axle section carrying the gear 17 or at a different rate of speed. It will thus be seen that the differential may function in the usual manner and allow the wheels of an automobile to rotate at different speeds from each other when the automobile is turning.

Figure 6:
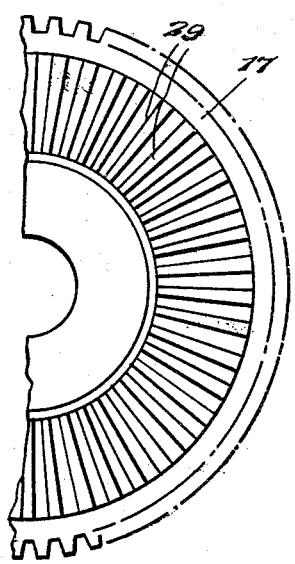
Fig. 6 is a fragmentary view of the gear with which the clutch engages.

As previously explained, it is desired to permit the gear 17 to be locked to the casing section 18 so that the two wheels of an automobile may be caused to rotate at the same rate of speed and thereby allow an automobile to be easily started if one wheel is resting upon a muddy or slippery place and also allow the two wheels of the automobile to be caused to rotate at the same rate of speed if a slippery place is encountered upon a road and prevent the automobile from skidding. In order to do so, there has been provided a clutch 25 consisting of a metal disk which fits loosely about the inner portion of the sleeve 6 of the housing section 3. Arms 26 which are spaced from each other circumferentially of the disk extend from its inner face and these arms pass through openings 27 formed through the casing section 20 and at their free ends are formed with teeth 28 disposed radially of the gear 17 and adapted to engage between teeth 29 formed in the outer face of the gear 17 and extending radially thereof, as shown in Figures 3 and 6. When the clutch is in the inoperative position shown in Figure 3, the gear 17 will be free from the gear casing and the differential may function in its usual manner but when the clutch is slid longitudinally of the axle section and the teeth upon its arms engage between the clutch teeth 29 of the gear 17, this gear will be locked to the gear casing and the two axle sections will rotate at the same rate of speed.

In order to normally retain the clutch in an inoperative position and allow it to be moved to an operative position when necessary, there has been provided actuating means which is carried by the housing section 3. This actuating means which is adapted to be actuated by the driver of the automobile, includes a yoke 30 which is disposed in a pocket 31 extending outwardly and radially of the housing section 3 at one side of the sleeve 6 and the arms of this yoke extend circumferentially of the clutch and at their ends are provided with pins 32 loosely received in openings 33 formed near the ends of a semi-circular strip or collar 34. This strip or collar fits into a groove 35 formed in the edge face of the clutch disk and extending circumferentially about the same and, therefore, the clutch may rotate with the gear casing and at the same time may be shifted from the inoperative position shown in Figure 3 to an operative position by movement of the yoke. The shank 36 of the yoke extends into a socket 37 formed at the outer side of the pocket 31 and this shank is formed with a bore 38 which is rectangular in cross section, as shown in Figure 3, and receives the squared portion 39 of a shaft or stem 40 which has its upper and lower portions circular in cross section so that it may be rotatably mounted, as shown in Figure 1. The upper end portion of the stem 40 projects outwardly and is formed with a squared portion 41 upon which is fitted a lever 42 and its extreme upper end is threaded to receive a securing nut 43 serving to hold the lever in place upon the stem. Another lever 44 fits upon the stem 40 and is secured at right angles to the lever 42 by a set screw 44'. This lever 44 is engaged by a spring 45 anchored to a screw eye 46 carried by the housing section 3 and the spring by exerting pull upon the lever 44 causes the yoke 36 to be normally held in the position shown in Figure 3 and yieldably retain the clutch in its inoperative position. The lever 42 extends longitudinally of the rear axle or driven shaft and at its free end is engaged by a rod 47 which may be of any length desired and extends towards the front of the automobile. This rod 47 may be connected with a treadle or equivalent operating element so that by placing his foot upon the treadle or grasping a hand lever and moving the same the operator of the automobile may shift the clutch to its operative position when necessary and lock the gear 17 to the gear casing and cause the two wheels to rotate at the same rate of speed.

Having thus described the invention, I claim:

1. In a differential, a housing, a gear casing rotatable in said housing, shafts rotatably mounted in opposed side walls of said housing and extending into said casing, gears fixed upon said shafts within said casing, a pinion rotatably mounted in said casing and meshing with said gears, a clutch rotatably mounted in said housing and having arms extending through an adjacent side wall of said casing to effect rotation of the clutch with the casing, the said arms each having teeth at its free end disposed radially of the gears and the outer side face of the adjacent gear being formed with clutch teeth extending radially thereof throughout its circumference, and means to move said clutch towards said casing for interlocking engagement with the clutch teeth of said gear and cause the two shafts to rotate in unison.

2. In a differential, a housing, a gear casing rotatable in said housing, shafts rotatably mounted in opposed side walls of said housing and extending into said casing, gears fixed upon said shafts within said casing, a pinion rotatably mounted in said casing and meshing with said gears, a clutch rotatably mounted in said housing and having arms extending through an adjacent side wall of said casing to effect rotation of the clutch with the casing, the said arms each having teeth at its free end and the outer side face of the adjacent gear being formed with clutch teeth extending radially thereof throughout its circumference, a yoke pivotally mounted in said housing and having arms straddling said clutch and connected therewith to slide the clutch towards and away from said casing when the yoke is swung about its pivot, and means operable externally of said housing to move said yoke and shift the clutch towards the casing for interlocking engagement with the gear.

3. In a differential, a housing, a gear casing rotatable in said housing, shafts rotatably mounted in opposed side walls of said housing and extending into said casing, gears fixed upon said shafts within said casing, a pinion rotatably mounted in said casing and meshing with said gears, a clutch rotatably mounted in said housing and having portions extending through an adjacent side wall of said casing to effect rotation of the clutch with the casing, the said portions having teeth at their free ends and the outer side face of the adjacent gear having clutch teeth extending radially thereof, a circumferentially extending groove being formed in said clutch, a saddle loosely engaged in said groove, a stem rotatably carried by said housing with one end projecting externally thereof, a portion of the shaft within the housing being enlarged and non-circular in cross section, a bushing threaded into said housing about the stem and bearing against the non-circular portion thereof to retain the stem in place, a yoke in said housing fitting upon the non-circular portion of said stem to move with the stem and having arms extending circumferentially of the clutch in straddling relation thereto and pivoted to said saddle, a lever fixed upon the outer end of said stem and when moved in one direction rotating the stem to swing the yoke towards said gear casing and shift the clutch to an operative position for clutching engagement with the loose gear, a second lever carried by said stem and resilient means engaged with the second lever to normally retain the clutch in an inoperative position.

In testimony whereof I affix my signature.

JACOB T. HUSTVET. [L. S.]